Figure 1:
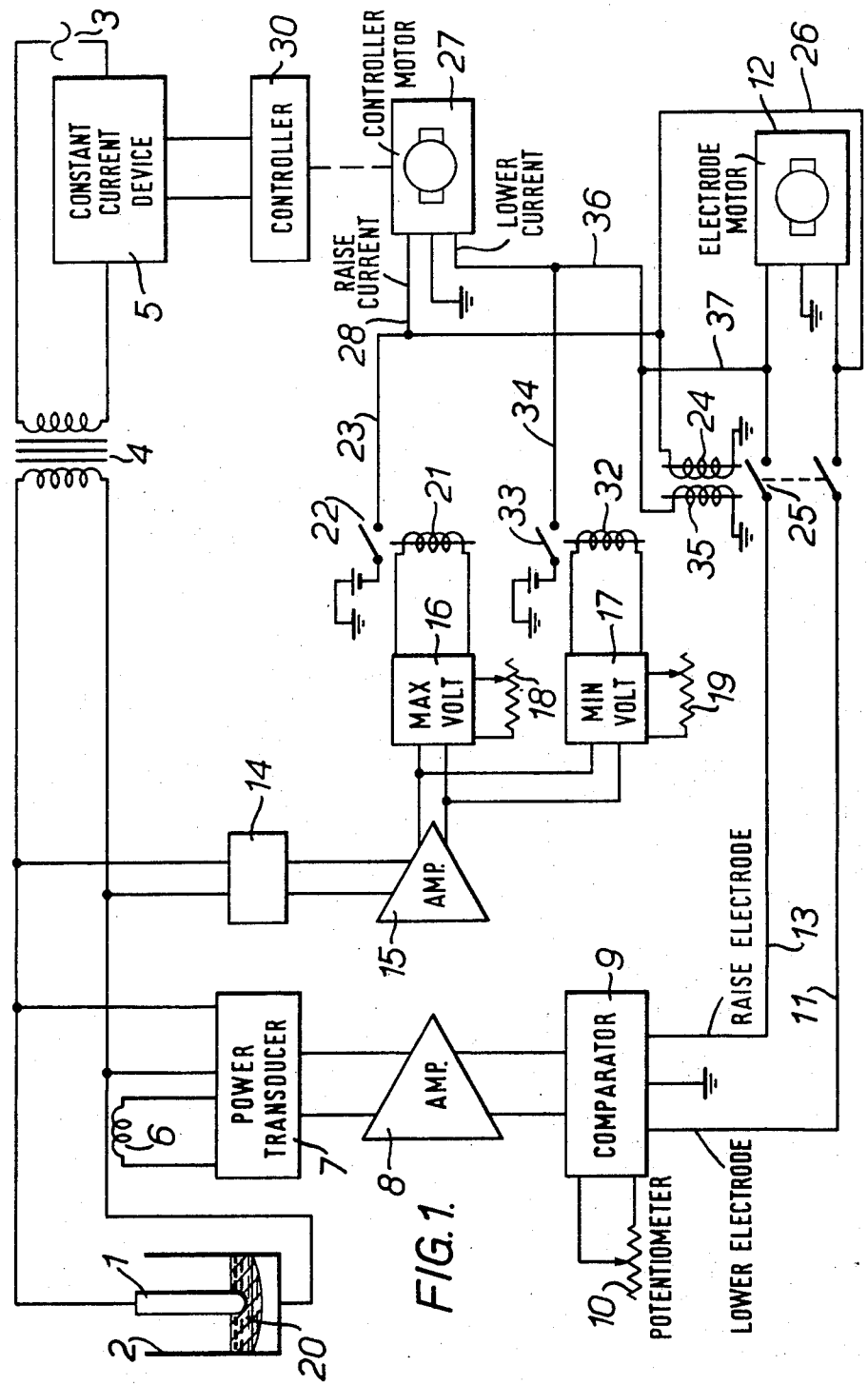

United States Patent [19]
Hoyle et al.

[11] 3,732,350
[45] May 8, 1973

[54] POWER CONTROL

[75] Inventors: Geoffrey Hoyle; David Melvin Longbottom, both of Sheffield, England

[73] Assignee: The British Iron and Steel Association, London, England

[22] Filed: Nov. 18, 1971

[21] Appl. No.: 199,914

[30] Foreign Application Priority Data
Dec. 3, 1970 Great Britain..................57452/70

[52] U.S. Cl............................................13/9, 13/13
[51] Int. Cl.................................................H05b 3/60
[58] Field of Search.....................13/9, 9 ES, 13, 12

[56] References Cited

UNITED STATES PATENTS

| 3,520,978 | 7/1970 | Svendsen | 13/13 |
| 3,665,080 | 5/1972 | Medovar et al. | 13/9 ES |

*Primary Examiner*—Roy N. Envall, Jr.
*Attorney*—Joseph F. Brisebois et al.

[57] ABSTRACT

Electroslag refining plant comprising an electrode, a mould for containing a bath of molten electrically-conductive slag into which the electrode depends and below which an ingot of refined material is formed, means for maintaining the supply of electric current to the electrode at a pre-determined value, means for detecting changes in the power supplied by the electrode to the slag bath, means for causing movement of the electrode relative to the formed ingot to maintain the power supplied at a required value, means for detecting movement of the electrode outside of pre-determined limits of maximum and minimum distances from the formed ingot and, upon such movement being detected, for returning the electrode to a position within said maximum and minimum distances and for re-setting the value of the current supply so that the required value of power supply can be met by movement of the electrode within the pre-determined limits.

9 Claims, 2 Drawing Figures

POWER CONTROL

This invention relates to the electroslag refining of metals.

Electroslag refining is a process for the secondary refining of metals, in which a slag within a mould is maintained in a molten state and at a temperature above the melting point of the metal to be refined. Unrefined metal is introduced into the mould and is refined as it passes through the slag in the form of molten droplets; refined droplets collect to form a pool below the slag. The mould walls and baseplate are cooled by the circulation of a coolant (normally water) and a solidified ingot is built up below the molten metal pool. The metal to be refined may be introduced to the mould in the form of one or more consumable electrodes and the slag maintained molten by passage of an electric current from the electrode to the baseplate of the mould; alternatively, the metal may be introduced in molten form or as particulate matter, for example in the form of scrap or pellets, electrical energy being supplied to the slag bath by means of one or more non-consumable electrodes.

Electroslag refining plant are known in which the electric current to the electrode is supplied from a constant current source and in which variations in power demand are countered by movement of the electrode relative to the formed ingot. Previously, however, such plant has suffered from the disadvantage that the power demand may be such that it cannot be met by movement of the electrode within the confines of the slag bath with the result that the electrode is moved either into contact with the metal pool below the slag bath or clear of the slag bath.

In accordance with one aspect of the invention, there is provided electroslag refining plant comprising an electrode, a mould for containing a bath of molten electrically-conductive slag into which the electrode depends and below which an ingot of refined material is formed, means for maintaining the supply of electric current to the electrode at a pre-determined valve, means for detecting changes in the power supplied by the electrode to the slag bath, means for causing movement of the electrode relative to the formed ingot to maintain the power supplied at a required value, means for detecting movement of the electrode outside of pre-determined limits of maximum and minimum distances from the formed ingot and, upon such movement being detected, for returning the electrode to a position within said maximum and minimum distances and for re-setting the value of the current supply so that the required value of power supply can be met by movement of the electrode within the pre-determined limits.

In accordance with the invention in another aspect, there is provided a process for electroslag refining in which an electrode depends into a bath of electrically-conductive slag formed in a mould, in which the electric current to the electrode is supplied from a constant current source and in which variations in power demand are countered by movement within pre-determined limits of the electrode relative to the ingot being formed, the step of activating a controller to change the current level maintained by the constant current source if the power demand rises or falls to a value which cannot be countered by movement of the electrode within the pre-determined limits.

In accordance with a further aspect of the invention, there is provided electroslag refining plant comprising an electrode, a mould for containing a bath of molten electrically-conductive slag into which the electrode depends and below which an ingot of refined material is formed, a method of controlling the power supplied by the electrode to the slag bath which comprises the steps of maintaining the supply of electric current to the electrode at a pre-determined value, detecting changes in the power supplied by the electrode to the slag bath, moving the electrode relative to the formed ingot to counter variations in the value of the power supplied, detecting movement of the electrode outside of pre-determined limits of maximum and minimum distances from the formed ingot and, upon such movement being detected, returning the electrode to a position within said limits and for resetting the value of the current supply such that the required power supply can be met by movement of the electrode within the pre-determined limits.

Figure 2:
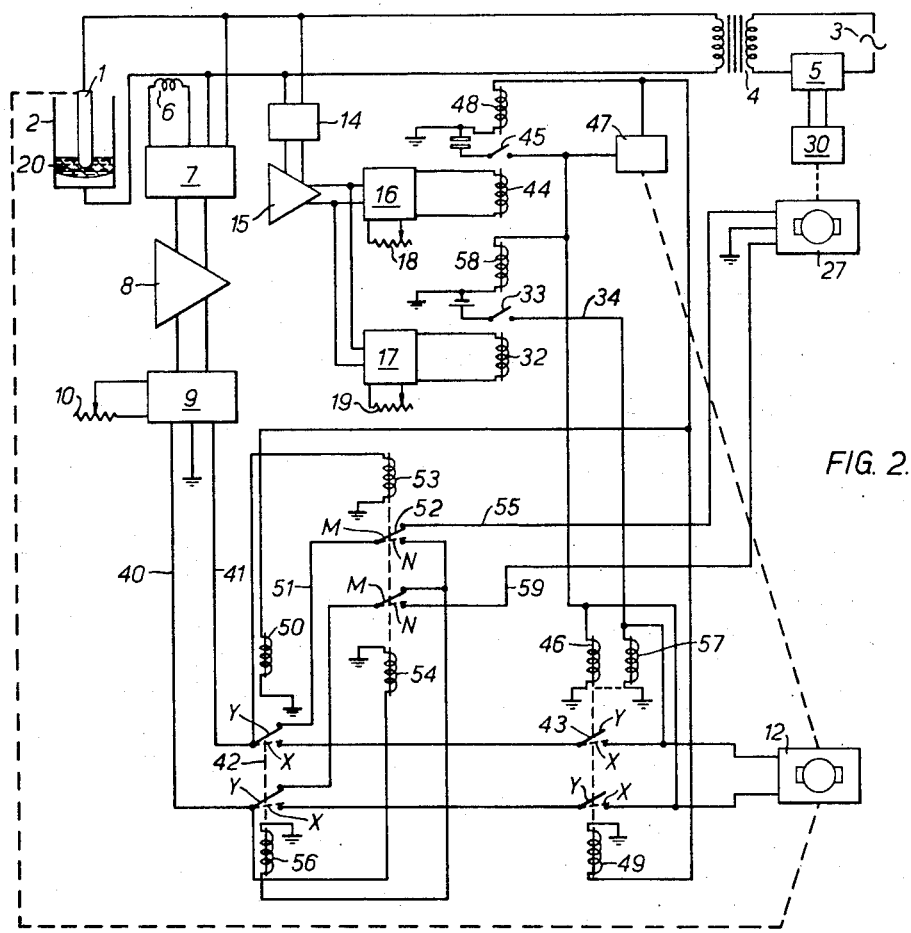

In the accompanying drawings,

FIGS. 1 and 2 are line diagrams of plant details in accordance with the invention.

Referring to FIG. 1, apparatus for the electroslag refining of a consumable electrode 1 in a cooled mould 2 comprises a source 3 of alternating current, a transformer 4 and a constant current device 5 (e.g. a saturable reactor) connected into the circuit of the primary winding of the transformer 4. Connected to voltage tappings and a current transformer 6 in the secondary circuit of transformer 4 is a transducer 7 which passes a signal proportional to the power input to the electrode 1 via an amplifier 8 to a comparitor 9; the signal is compared with a reference voltage across a potentiometer 10 corresponding to the desired power input to the electrode 1. If the measured power reading is higher than that desired, a "lower electrode" signal is transmitted by a circuit 11 to a winch motor 12 operable to raise or lower the electrode 1. If, on the other hand, the measured power reading is lower than that desired, a "raise electrode" signal is transmitted by a circuit 13 to the winch motor 12.

The reference voltage across the potentiometer 10 may be periodically or continuously varied to maintain a desired melt rate or reduce the melt rate for hot topping at the conclusion of a melt.

A signal corresponding to the voltage drop across the slag bath within the mould 2 is passed via a rectifier 14 and amplifier 15 to comparitors 16, 17 in which it is compared with reference voltages developed across potentiometers 18, 19 respectively, corresponding to the maximum and minimum desired voltage inputs to the electrode 1. If, when an increase in power input is required, the demand is such that the electrode 1 is raised clear of the slag bath 20 before the demand has been met, arcing will occur accompanied by a sudden increase in voltage. The measured voltage will, consequently, increase to a value higher than the reference voltage set by potentiometer 18 whereupon a relay 21 is operated which closes a switch 22 of a circuit 23. Closure of switch 22 activates a relay 24 which operates to open a multi-switch 25 to isolate circuits 11 and 13 from the winch motor 12; in addition, the winch motor 12 is activated via a circuit 26 to lower the electrode 1 and a motor 27 is operated through a circuit 28 to activate a constant current supply controller 30 to increase either stepwise or continuously the current level maintained by reactor 5.

Lowering of the electrode 1 decreases the voltage across the slag bath 20 and this voltage reduction is countered by increasing the current level in reactor 5 to a value at which the required power demand can be met with the electrode 1 within the slag bath 20; the change in voltage due to electrode motion should exceed that due to the increase in current level by an amount so that there is an overall voltage drop across the slag bath 20. The electrode 1 will continue to be lowered until the measured voltage falls below the reference voltage set by potentiometer 18 by a predetermined amount whereupon the relay 21 is de-activated to switch off circuit 23 to prevent further electrode movement and current level change. In addition, circuits 11, 13 are reconnected to the winch motor 12 upon de-activation of relay 24. On completion of switching, a return is made to control of electrode movement by transducer 7.

If the power input to the electrode 1 is not reduced sufficiently when the measured voltage is equal to or less than the reference minimum voltage developed across potentiometer 19, the comparitor 17 operates relay 32 to close a switch 33. Closure of switch 33 operates via a circuit 34 a relay 35 mechanically coupled to relay 24 to open multi-switch 25 to isolate circuits 11, 13 from the electrode winch motor 12; also, the controller motor 27 is operated via a circuit 36 to activate controller 30 to decrease either stepwise or continuously the current level maintained by the reactor 5, and winch motor 12 is operated through a circuit 37 to raise the electrode 1. Raising of the electrode 1 increases the voltage across the slag bath and this voltage increase is countered by reducing the current level in reactor 5 to a value at which the required reduction in power demand can be met without a corresponding reduction in voltage to a value equal to or less than the reference voltage developed across potentiometer 19; the change in voltage due to electrode movement should be less that that due to the reduction in current level by an amount such that there is an overall voltage increase across the slag bath 20. The electrode 1 is raised until the measured voltage exceeds the reference maximum voltage developed across potentiometer 19 by a predetermined amount. When this occurs, relay 32 is de-activated to prevent further electrode movement and current change, and reconnect circuits 11 and 13 with winch motor 12.

On completion of switching, a return is made to control of electrode movement by transducer 7.

Reference will now be made to the embodiment illustrated in FIG. 2 in which like parts to those illustrated in FIG. 1 bear the same reference numerals. A transducer 7 is connected to a current transformer 6 and voltage tappings across a consumable electrode 1 and the baseplate of a mould 2. The signal from the transducer 7 is passed via an amplifier 8 to a comparitor 9 in which it is compared with a reference voltage corresponding to the desired power level set by a potentiometer 10. If the measured voltage is above or below that desired, a "lower electrode" or "raise electrode" signal is respectively transmitted by circuit 40 or circuit 41 to winch motor 12 via multi-switches 42, 43 in the position X shown in broken line in the drawing. As the electrode 1 is raised, the power will increase; if the power demand is such that the electrode 1 is raised to a position in which it is clear of the slag bath in the mould 2, arcing will occur accompanied by a sudden increase in voltage. As in FIG. 1 embodiment, a signal corresponding to the voltage in the secondary circuit of transformer 4 is passed via a rectifier 14 and amplifier 15 to comparitors 16 and 17 in which it is compared with reference signals corresponding respectively to the maximum and minimum desired voltage inputs to the electrode 1 set by potentiometers 18 and 19 respectively. If the measured voltage exceeds the reference value set by potentiometer 18, a relay 44 is operated to close a switch 45 and to activate a circuit which operates relay 46 to move multi-switch 43 to position Y shown in full line in the drawing to isolate circuits 40 and 41 from the winch motor 12; also, the winch motor 12 is operated to lower the electrode 1 and a device 47 activated which operates relays 48, 49, 50 after a predetermined electrode movement to return the electrode 1 to the upper region of the slag bath 20. Relay 48 operates to open switch 45 to prevent further movement of electrode 1; relay 49 operates to move multi-switch 43 to position X to reconnect circuits 40 and 41 to the winch motor 12; and relay 50 operates to move multi-switch 42 to the position Y. When the switch 42 is in position Y, an "increase current" signal is transmitted by circuit 51 to a multi-switch 52 operated by relays 53, 54. When a signal is transmitted from comparitor 9 via circuit 41, the switch 52 is moved by relay 53 to position M shown in full line in the drawing. With the switch in this position, current passes through circuit 55 to a controller motor 27 which activates a constant current controller 30 to increase the current level maintained by a saturable reactor 5. While the switch 42 is in position Y, the signal from comparitor 9 via circuit 41 which previously passed to the winch motor 12 to effect raising of the electrode 1 is employed to increase the current level in reactor 5. Consequently, while the current is varying, the electrode remains stationary. When the current has been increased to such a level that the power measured by transducer 7 just exceeds the reference vlaue set by potentiometer 10, a signal is passed by circuit 40 to relay 56 which returns multi-switch 42 to position X; in this position, any power change due to electrode melting is compensated for by electrode movement controlled by transducer 7.

If the measured power is above that desired and is such that the electrode 1 is lowered to a position in which the voltage across the slag drops to a value equal to or below the reference voltage developed across potentiometer 19, a signal is passed to relay 32 which closes switch 33 activating circuit 34. Current is therefore passed to operate a relay 57 mechanically coupled to relay 46 to move multi-switch 43 to position Y and to operate winch motor 12 to raise the electrode 1. When the electrode has been moved to a position above the slag bath 20, the measured voltage increases to a value in excess of the reference value set by potentiometer 18. Relay 44 is therefore activated to close switch 45 and a signal is passed to operate a relay 58 to open switch 33 to prevent further upwards movement of the electrode 1. Also, winch motor 12 is operated to lower the electrode and device 47 activated which operates relays 48, 49, 50 after a predetermined electrode movement to return the electrode 1 to the upper region of the slag bath 20. As before, relay 48 operates to open switch 45 to prevent further downwards movement of electrode 1, relay 49 operates to move multiswitch 43 to position X and relay 50 operates to move multi-switch 42 to position Y. In this position, a signal is passed from comparitor 9 via circuit 40 to relay 54 which operates to move switch 52 to position N as shown in broken line in the drawing; current is then passed via circuit 59 to the controller motor 27 which activates the controller 30 to decrease the current level maintained by the reactor 5. When the current has been decreased to such a level that the measured power is just less than the reference value set by potentiometer 10, a signal is passed by circuit 41 to relay 56 which returns multi-switch 42 to position X; in this position, any power change due to electrode melting is countered by electrode movement controlled by transducer 7.

In either embodiment, the maximum and minimum reference values set by potentiometers 18 and 19 may be varied. For example, they may be varied in concert with variations in the secondary voltage brought about by changes in the slag bulk.

We claim:

1. Electroslag refining plant comprising an electrode, a mould for containing a bath of molten electrically-conductive slag into which the electrode depends and below which an ingot of refined material is formed, means for maintaining the supply of electric current to the electrode at a pre-determined value, means for detecting changes in the power supplied by the electrode to the slag bath, means for causing movement of the electrode relative to the formed ingot to maintain the power supplied at a required value, means for detecting movement of the electrode outside of pre-determined limits of maximum and minimum distances from the formed ingot and means for returning the electrode to a position within said maximum and minimum distances upon such movement being detected, and means for resetting the value of the current supply so that the required value of power supply can be met by movement of the electrode within the pre-determined limits.

2. Electroslag refining plant according to claim 1, wherein the means for maintaining the supply of electric current to the electrode at a pre-determined value comprises a saturable reactor.

3. Electroslag refining plant according to claim 1, wherein the power supplied by the electrode to the slag bath is measured by a transducer connected to receive signals representative of the voltage drop across the slag bath and the current passing through the slag bath and wherein the transducer is connected electrically to a comparator in which the measured value of the power supplied is compared with a pre-determined power value.

4. Electroslag refining plant according to claim 3, wherein the comparator is connected to pass signals representative of differences in the measured and predetermined power values to an electrode drive motor operable to cause movement of the electrode relative to the formed ingot.

5. Electroslag refining plant according to claim 1, wherein the means for detecting movement of the electrode outside of pre-determined limits of maximum and minimum distances from the formed ingot comprises means for comparing the voltage drop across the slag bath with reference voltages representing pre-determined maximum and minimum voltages.

6. electroslag refining plant according to claim 5, wherein the voltage comparing means are each connected to switching devices operable to disconnect the connection between the comparator and the electrode drive motor, to operate the motor to move the electrode in a direction opposite to that in which it was moving before activation of the switching device, and to reset the value of the current supply to the electrode such that the required power supply can be met by movement of the electrode within the pre-determined limits.

7. Electroslag refining plant according to claim 1, wherein the electrode comprises a consumable electrode of the material to be refined.

8. In a process for electroslag refining in which an electrode depends into a bath of electrically-conductive slag formed in a mould, which process comprises the steps of supplying electric current to the electrode from a constant current source and countering variations in power demand by movement within pre-determined limits of the electrode relative to the ingot being formed, the improvement which comprises the step of changing the current level maintained by the constant current source when the power demand rises or falls to a value which cannot be countered by movement of the electrode within the pre-determined limits.

9. In electroslag refining plant comprising an electrode, a mould for containing a bath of molten electrically-conductive slag into which the electrode depends and below which an ingot of refined material is formed, a method of controlling the power supplied by the electrode to the slag bath which comprises the steps of maintaining the supply of electric current to the electrode at a pre-determined value, detecting changes in the power supplied by the electrode to the slag bath, moving the electrode relative to the formed ingot to counter variations in the value of the power supplied, detecting movement of the electrode outside of pre-determined limits of maximum and minimum distances from the formed ingot, and, upon such movement being detected, returning the electrode to a position within said limits and for resetting the value of the current supply such that the required power supply can be met by movement of the electrode within the predetermined limits.

* * * * *